Patented Dec. 2, 1941

2,264,749

UNITED STATES PATENT OFFICE 2,264,749

CERAMIC PIGMENT FOR GRAINING

Charles G. Geary, Perth Amboy, N. J., assignor to E. I. du Pont de Nemours & Company, Wilmington, Del., a corporation of Delaware No Drawing. Application July 24, 1940,
Serial No. 347,147

6 Claims. (Cl. 106—292)

This invention is concerned with the preparation of an improved ceramic pigment for graining. More particularly, it is concerned with the preparation of a black ceramic pigment which is especially satisfactory for use in printing or surface ornamentation on vitreous enamels, said black pigment being of the copper-chrome type.

The usual practice of decorative printing on vitreous enamels is known as graining or marbleizing. It consists essentially in applying a pigment suspended in a suitable medium to an etched marble slab or metal plate, or to a flat piece of wood, removing the excess pigment by scraping so that only the indented portion of the etching contains pigment, and transferring this pigment to the surface of the enameled ware by means of a rubber or soft composition roller. In this way a design is imprinted on the enamel, which enamel may be fired or unfired prior to the printing operation but is usually in the unfired condition. The ware containing the vitreous enamel is then subjected to firing and the design, which may take any desired form, is fused or burned into the surface of the enamel.

Not all ceramic pigments are satisfactory for the purpose of printing or decorating the surfaces of vitreous enamels by means of the process known as graining or marbleizing. It is particularly true that many black pigments, especially those of the copper-chrome type, are unsuitable for this purpose since they show a tendency to sink into the surface of the enamels to which they are applied, thus leaving an uneven surface with the lines of the design indistinct and sunken. This is particularly true of pigments of the copper-chrome type containing a large percentage of chromium. As a result, it has been generally impossible to employ copper-chrome black pigments for graining purposes, and it has been necessary to utilize other types of black pigments where decorating or printing on the surface of the vitreous enamels has been carried out.

It is an object of this invention to prepare black ceramic pigments of the copper-chrome type which will be entirely suitable for graining and which, when utilized for decorative printing on virteous enamels, will result in perfectly smooth graining, comparable with the best results obtainable with any of the graining pigments employed for this purpose. It is an object of this invention, therefore, to improve ceramic black pigments of the copper-chrome type so as to render them suitable for graining or marbleizing on the surface of virteous enamels by the inclusion therein of small amounts of various agents which will eliminate the undesirable sinking into the surface of the enamel, a defect generally characteristic of untreated ceramic black pigments of the copper-chrome type. These and still other objects of my invention will be apparent from the ensuing disclosure.

I have found that when a metal cyanide is added in relatively small amount, usually not over 5% by weight, to a black ceramic pigment of the copper-chrome type the pigment is especially suitable for use as a graining pigment for decorative printing on vitreous enamels. No sinking of the pigment into the surface of the enamel, or sunken or uneven surfaces on the design, result when it is employed in the usual graining or marbleizing process. Among the metal cyanides that I have found suitable are cobalt cyanide, cadmium cyanide, cuprous cyanide, and zinc cyanide. However, zinc cyanide may be regarded as the most satisfactory when present in amounts corresponding to not over 5% by weight of the total pigmentary composition. Cuprous cyanide is but slightly inferior to zinc cyanide and almost equally successful results are secured when employing cuprous cyanide in amounts not exceeding 5% by weight of the total pigment.

It has been found that amounts of the metallic cyanide ranging from 1 to 5%, based on the total weight of the pigment, are preferably utilized. Less than 1% of the cyanide salt is usually insufficient for most copper-chrome pigments, although sometimes amounts less than 1% may be used. Over 5% of the cyanide may affect the utility of the pigment when used for purposes other than graining such as for coloring vitreous enamels. Thorough admixture of the cyanide and pigment should be accomplished by milling the cyanide with the copper-chrome pigment, preferably in a ball or pebble mill. Although it will usually be found most advantageous to add these cyanides to the copper-chrome pigment previous to milling and washing, the cyanide addition may be made to the finished color, or even to the graining medium. Addition to the pigment subsequent to milling and washing is especially desirable when utilizing cadmium cyanide as the added agent, as this cyanide is somewhat soluble.

As examples of my improved black pigment especially valuble for graining or marbleizing on vitreous enamel surfaces the following may be given:

Example 1

To 50 grams of a copper-chrome black ceramic pigment, prepared by calcination of a batch calculated to give a chromium-to-copper molecular ratio of 2:1, there was added one gram of zinc cyanide. The mixture was milled in a pebble mill of one quart capacity with 50 cc. of water for one hour. At the conclusion of this milling the pigment was washed until the wash water was colorless, whereupon the pigment was then dried in a steam chest.

When this pigment was utilized for graining by the usual printing methods no sinking or blurring of the design was noticeable. The results secured by printing on the vitreous enamel surfaces were fully as satisfactory as those obtainable with the special, relatively expensive, black ceramic graining pigments now known to the art.

*Example 2*

To 10 grams of a copper-chrome black, calcined as in Example 1 and washed free of soluble chrome, was added 0.4 gram of cobalt cyanide. To insure proper mixing, the ingredients were mulled on a glass slab in a dry state, and further mulled after addition of the cobalt cyanide graining medium. The resulting paste was very satisfactory when utilized for decorating vitreous enamels by the usual printing or marbleizing methods.

*Example 3*

To 10 grams of a black pigment of the copper-chrome type, obtained from a commercial supply house, was added 0.4 gram of zinc cyanide. Thorough mixing was accomplished by mulling on a glass slab. The resulting pigment was then grained in the usual manner and showed a marked improvement over the uncyanided pigment.

The addition of metallic cyanides to pigments of the copper-chrome type to prepare graining pigments, as described above, results in the manufacture of especially strong black pigments which are easily prepared from relatively inexpensive starting materials. The cost of my improved graining pigments is much less than the cost of those black oxides now utilized commercially for the decoration of vitreous enamels by graining.

It should be understood that various changes may be made in the process and improved pigments as described which will nevertheless come within the scope of my invention. Thus, details given herein as merely illustrative, such as milling times, amounts, washing procedures, etc., should not be construed as restrictive except as necessitated by the appended claims. Various changes may be made in the amounts and proportions specified, which changes are to be considered as part of my invention in accordance with the claims as construed by the prior art.

I claim:

1. An improved black ceramic graining pigment which comprises a black ceramic pigment of the copper-chrome type to which has been added a metal cyanide selected from the group which consists of cobalt cyanide, cadmium cyanide, cuprous cyanide and zinc cyanide.

2. An improved black ceramic graining pigment which comprises a copper-chrome black ceramic pigment and a metal cyanide selected from the group which consists of cobalt cyanide, cadmium cyanide, cuprous cyanide and zinc cyanide, said metal cyanide being present in amounts varying from 1 to 5% by weight, based on the total weight of the composition.

3. An improved black ceramic graining pigment which comprises a copper-chrome black ceramic pigment and a metal cyanide selected from the group which consists of cobalt cyanide, cadmium cyanide, cuprous cyanide and zinc cyanide, said metal cyanide being present in amounts not over 5% by weight, based on the total weight of the composition.

4. An improved black ceramic graining pigment which comprises a black ceramic pigment of the copper-chrome type and from 1 to 5% by weight, based on the weight of the total composition, of zinc cyanide.

5. An improved black ceramic graining pigment which comprises a black ceramic pigment of the copper-chrome type and from 1 to 5% by weight, based on the weight of the total composition, of cuprous cyanide.

6. An improved black ceramic graining pigment which comprises a black ceramic pigment of the copper-chrome type and from 1 to 5% by weight, based on the weight of the total composition, of cadmium cyanide.

CHARLES G. GEARY.